United States Patent
Bae

(10) Patent No.: US 10,266,160 B2
(45) Date of Patent: Apr. 23, 2019

(54) MASTER CYLINDER

(71) Applicant: MANDO CORPORATION, Pyeongtaek-si (KR)

(72) Inventor: Joon-Hyung Bae, Seongnam-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 531 days.

(21) Appl. No.: 14/711,769

(22) Filed: May 14, 2015

(65) Prior Publication Data

US 2015/0329040 A1  Nov. 19, 2015

(30) Foreign Application Priority Data

May 14, 2014 (KR) ........................ 10-2014-0057701

(51) Int. Cl.
| | |
|---|---|
| *B60T 17/22* | (2006.01) |
| *B60T 7/04* | (2006.01) |
| *B60Q 1/44* | (2006.01) |
| *B60T 11/16* | (2006.01) |

(52) U.S. Cl.
CPC .............. *B60T 7/042* (2013.01); *B60Q 1/445* (2013.01); *B60T 11/165* (2013.01); *B60T 17/22* (2013.01)

(58) Field of Classification Search
CPC ....................................................... B60T 17/22
See application file for complete search history.

(56) References Cited

U.S. PATENT DOCUMENTS 5,066,940 A * 11/1991 Schmidt ................. B60Q 1/441
340/450.1

6,951,104 B2 * 10/2005 Stobrawe ............ F15B 15/2892
60/534
2013/0086900 A1 * 4/2013 Kim ........................ B60T 11/16
60/533

FOREIGN PATENT DOCUMENTS

| CN | 1183138 | 5/1998 |
|---|---|---|
| CN | 1767974 | 5/2006 |
| CN | 101184659 | 5/2008 |
| CN | 102996689 | 3/2013 |
| DE | 20116818 | * 2/2002 |
| EP | 1 254 819 | 11/2002 |

(Continued)

OTHER PUBLICATIONS

Office Action dated May 18, 2017 for Chinese Patent Application No. 201510243824.6 and its English machine translation by Global Dossier.

(Continued)

*Primary Examiner* — F Daniel Lopez
(74) *Attorney, Agent, or Firm* — Ladas & Parry, LLP

(57) ABSTRACT

Disclosed is a master cylinder for a vehicle brake. The master cylinder includes a cylinder body provided with a hollow bore, a primary piston configured to perform a reciprocating motion in the hollow bore in linkage with a pedal, a secondary piston configured to move in linkage with the motion of the primary piston, and a Brake Light Stop (BLS) sensor module comprising a magnet provided at the primary piston and provided in a ring shape, and a hall sensor installed at an outer side of the cylinder body to correspond to the magnet and configured to control on/off operations of a brake lamp by sensing a magnetic flux density according to the reciprocating motion of the primary piston, wherein the magnet has both sides thereof supported by the primary piston and a return spring that is provided between the primary piston and the secondary piston, respectively.

8 Claims, 4 Drawing Sheets

(56) References Cited

FOREIGN PATENT DOCUMENTS

| | | |
|---|---|---|
| JP | 2009-274523 | 11/2009 |
| KR | 10-2006-0006916 | 1/2006 |

OTHER PUBLICATIONS

Office Action dated Feb. 2, 2015 for Korean Patent Application No. 10-2014-0057701 and its English translation by Global Dossier.

* cited by examiner

[Fig 1]
RELATED ART
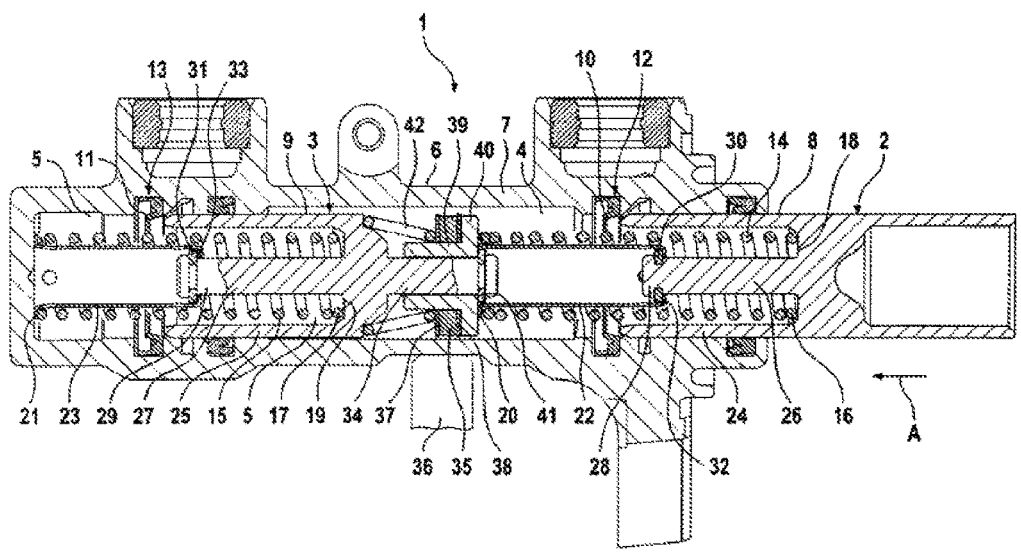

[Fig 2]
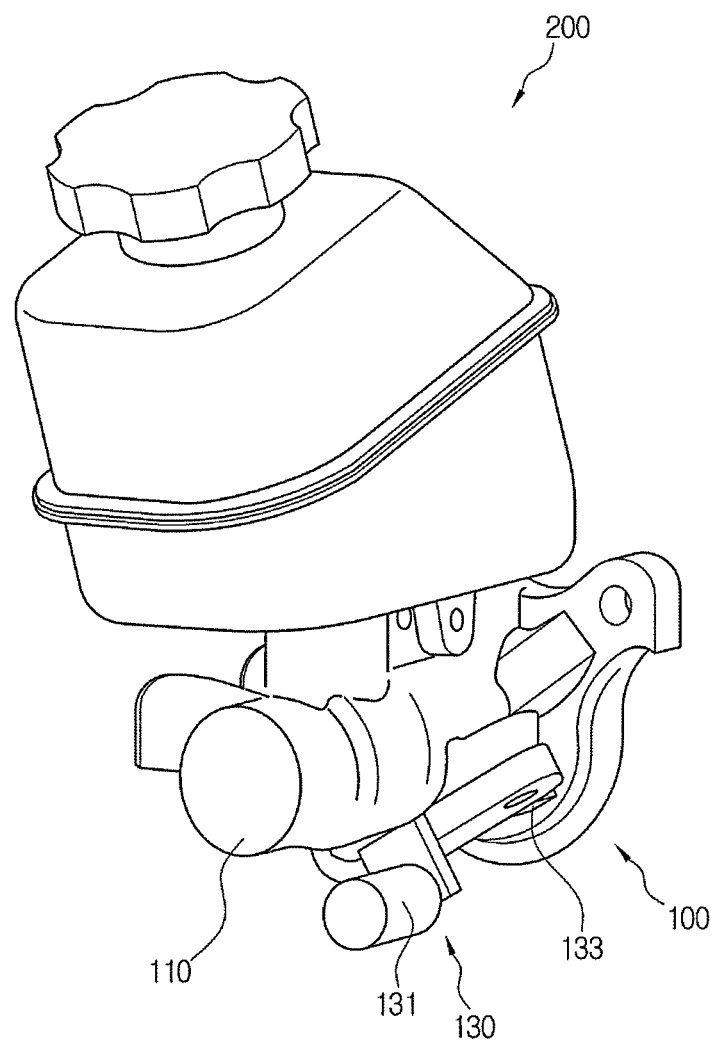

[Fig 3]
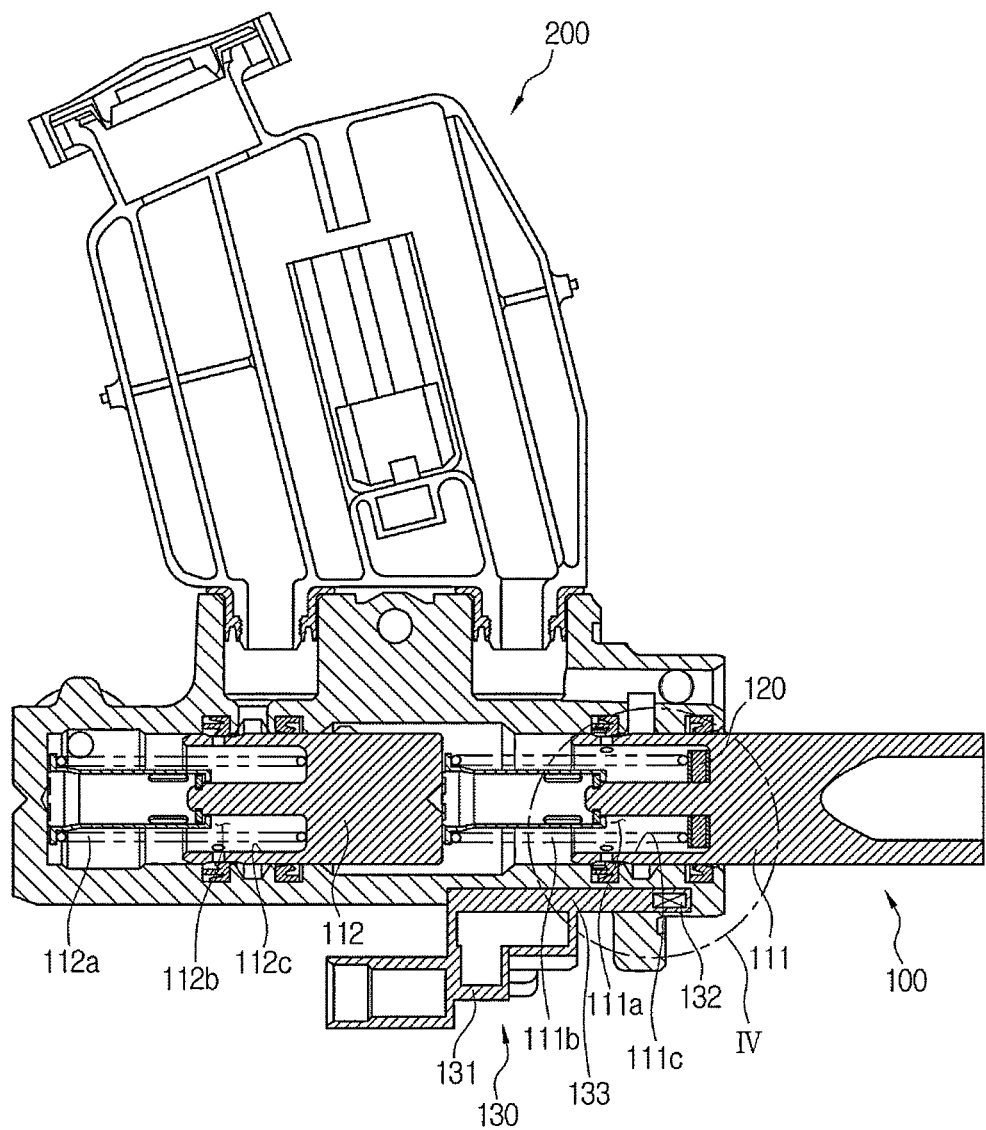

[Fig 4]
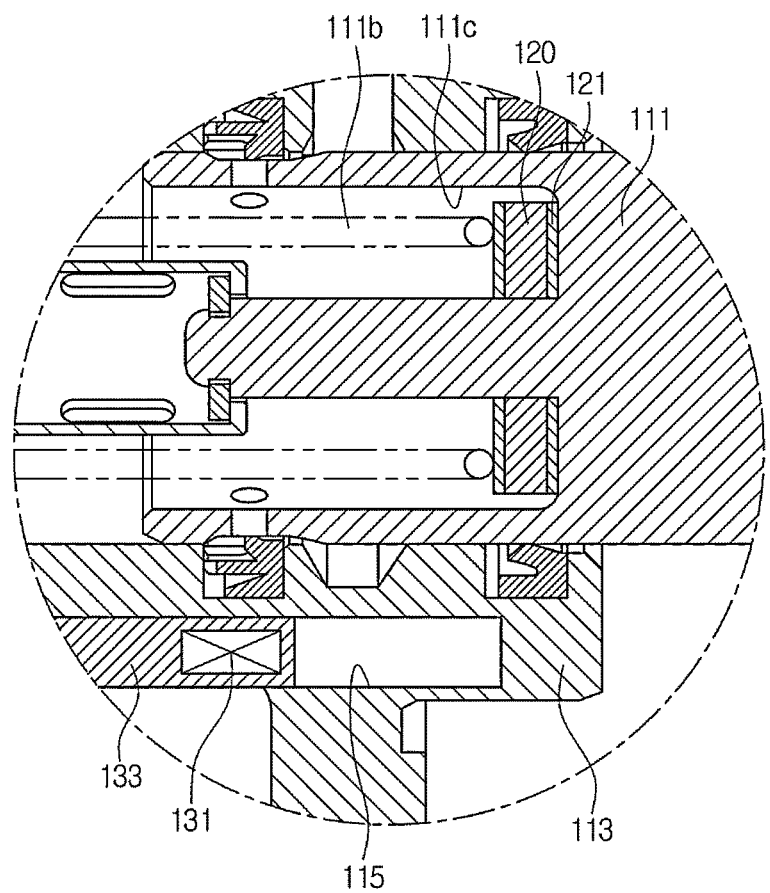

MASTER CYLINDER

CROSS-REFERENCE TO RELATED APPLICATION

This application claims the benefit of Korean Patent Application No. 10-2014-0057701, filed on May 14, 2014 in the Korean Intellectual Property Office, the disclosure of which is incorporated in its entirety herein by reference.

BACKGROUND

1. Field

Embodiments of the present disclosure relate to a master cylinder for a vehicle, and more particularly, to a master cylinder including a brake light stop sensor module (BLS) that controls on/off operations of a brake lamp by using a hall sensor and a magnet.

2. Description of the Related Art

In general, a master cylinder for a vehicle brake represents an apparatus for generating a braking force by converting a force, which is generated from a boosting apparatus based on a difference in the vacuum pressure and the atmospheric pressure, into a hydraulic pressure and by transmitting the hydraulic pressure into wheel cylinders.

The brake master cylinder is provided with a Brake Light Stop Sensor Module (BLS) for turning on and off a brake lamp by sensing an operation of a piston according to a stepping force of a pedal.

PRIORITY ART DOCUMENT

Korean Unexamined Patent Application Publication No. 10-2006-0006916 (Jan. 20, 2006).

The above document discloses a master cylinder for turning on and off a brake lamp by using a hall sensor. As shown in FIG. 1, the conventional brake master cylinder includes a primary piston 2 and a secondary piston 3 that are provided inside a master cylinder 1 so as to slidably move according to a pedal force of a pedal (not shown), a magnet 35 supported by a collar 40 of a sleeve connected to the secondary piston 3, and a hall sensor 36 provided at an outer side of the master cylinder 1 to correspond to the magnet 35. The hall sensor 36 turns on and off a brake lamp by detecting the intensity of a magnetic force according to movement of the magnet 35 installed at the piston 3.

According to the document described above,
a ring type magnet is provided on the secondary piston in a cylinder body. However, the secondary piston may fail to operate in some operating conditions, such as a piston adhesion during a braking operation or electronic stability control (ESC) defect or traction control system (TCS) defect, which causes difficulty in properly turning on the brake map.

In addition, in order to install the magnet 35 as shown in the drawing, a sleeve 22, a collar 40 and a spring member need to be provided between the primary piston 2 and the secondary piston 3, which causes the structure of parts and increases the length of the master cylinder.

SUMMARY

Therefore, it is an aspect of the present disclosure to provide a master cylinder having a BLS sensor module installed in a compact manner while improving the operating stability.

Additional aspects of the invention will be set forth in part in the description which follows and, in part, will be obvious from the description, or may be learned by practice of the disclosure.

In accordance with one aspect of the present disclosure, a master cylinder includes: a cylinder body, a primary piston, a secondary piston and a Brake Light Stop (BLS) sensor module. The cylinder body may be provided with a hollow bore. The primary piston may be configured to perform a reciprocating motion in the hollow bore in linkage with a pedal. The secondary piston may be configured to move in linkage with the motion of the primary piston. The Brake Light Stop (BLS) sensor module may include a magnet provided at the primary piston and provided in a ring shape, and a hall sensor installed at an outer side of the cylinder body to correspond to the magnet and configured to control on/off operations of a brake lamp by sensing a magnetic flux density according to the reciprocating motion of the primary piston. The magnet may have both sides thereof supported by the primary piston and a return spring that is provided between the primary piston and the secondary piston, respectively.

The primary piston may include a spring accommodation groove into which the return spring is introduced to reduce a size of the master cylinder, and the magnet may be provided in the spring accommodation groove.

The magnet may have both sides thereof supported by an inner wall of the spring accommodation groove and the return spring, respectively.

The cylinder body may include a boosting apparatus fixing part at which a boosting apparatus is installed. The hall sensor may be insertedly fixed to a mount hole that is provided in the boosting apparatus fixing part in a direction along a reciprocating motion of the primary piston.

The hall sensor may include a sensor housing allowing the hall sensor to be coupled to the cylinder body, and a magnetic detection element configured to sense change in a magnetic force according to a positional change of the magnet. The magnetic detection element may be provided in an element casing that protrudes from the sensor housing. The element casing may be combined with the mount hole.

The cylinder body may include a mount hole in which the hall sensor is installed, and the mount hole may be provided in parallel to the hollow bore provided in the cylinder body, and may be open in a direction oriented away from the hollow bore.

The cylinder body may include a mount hole in which the hall sensor is installed, and the mount hole may be provided in a direction along which the primary piston reciprocates.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a cross-sectional view schematically illustrating a master cylinder including a BLS sensor module according to the conventional technology;

FIG. 2 is a perspective view schematically illustrating a master including a BLS sensor module according to an exemplary embodiment of the present disclosure;

FIG. 3 is a cross-sectional view illustrating a master cylinder including a BLS sensor module according to an exemplary embodiment of the present disclosure; and FIG. 4 is an enlarged view illustrating a portion of FIG. 3.

DETAILED DESCRIPTION

Various embodiments will now be described more fully with reference to the accompanying drawings in which some embodiments are shown. These inventive concepts may, however, be embodied in different forms and should not be construed as limited to the embodiments set forth herein. Rather, these embodiments are provided so that this disclosure is thorough and complete and fully conveys the inventive concept to those skilled in the art. In the drawings, the sizes and relative sizes of layers and regions may be exaggerated for clarity.

FIG. 2 is a perspective view schematically illustrating a master including a BLS sensor module according to an exemplary embodiment of the present disclosure, and FIG. 3 is a cross-sectional view illustrating a master cylinder including a BLS sensor module according to an exemplary embodiment of the present disclosure.

Referring to FIGS. 2 and 3, a brake master cylinder 100 according to an exemplary embodiment of the present disclosure includes a cylinder body 110 provided with one end portion thereof open and the other end portion closed and having a cylindrical hollow bore while connected to a boosting apparatus, a first piston 111 and a second piston 112 provided in the bore of the cylinder body 110 and slidably reciprocating according an operation of a brake pedal (not shown) by a driver, a ring-shaped magnet 120 installed at the first piston 111, and a hall sensor 130 installed at an outer side of the cylinder body 110 to sense a magnetic force of the magnet. The first piston 111, which is provided adjacent to the pedal and operates while directly linked with the pedal, is referred to as a primary piston. The second piston 112, which is connected in series with the first piston 111 and operates in linkage with an operation of the first piston 111, is referred to as a secondary piston.

In the bore of the cylinder body 110, a space formed between the first piston 111 and the second piston 112 is provided as a first oil pressure chamber 111a in which a liquid pressure is formed, and a space formed between the second piston 112 and an inner wall of the other end of the cylinder body 110 is provided as a second liquid pressure chamber 112a in which a liquid pressure is formed. The first liquid pressure chamber 111a and the second liquid pressure chamber 112a are provided with a first return spring 111b and a second return spring 112b, respectively, to return the first piston 111 and the second piston 112 to original positions thereof, respectively, upon releasing from a braking state. In addition, the first piston 111 and the second piston 112 include a first spring accommodation groove 111c and a second spring accommodation groove 112c allowing the first return spring 111b and the second return spring 112b to be introduced into the first piston 111 and the second piston 112, respectively.

According to the present disclosure, the ring-shaped magnet 120 is provided at the first piston 111. Since the second piston 112 may fail to operate in some operating conditions, such as a piston adhesion during a braking operation or ESC or TCS defects as described above, the ring-shaped magnet 120 is provided at the first piston 11 that operates while directly linked with the pedal, so that the magnet 120 is prevented from failing to operate.

In detail, the magnet 120 is provided between one side wall of the piston 111 and the first return spring 111b, in detail, between the first return spring 111b and an inner wall of the first spring accommodation groove 111c of the first piston 111 that is provided to reduce the entire length of the master cylinder Accordingly, both sides of the magnet 120 are firmly supported by one end of the first return spring 111b and the inner wall of the first spring accommodation groove 111c, respectively, so that the position of the magnet 120 is prevented from being changed without an additional fixing member, and the assembly process may be easily performed.

In addition, the magnet 120 may be provided with washers 121 provided at both sides thereof, respectively. The pair of washers 121 is formed of steel, and comes to close contact with the both sides of the magnet 120, respectively, to collect a magnetic flux, and also serves to protect the magnet 120 from being damaged. That is, as the washers 121 are installed on the magnet 120, the hall sensor 130 may have an improved sensibility than using a magnet having no washers and having the same magnetic force.

The hall sensor 130 is fixedly installed at an outer side of the cylinder body 110. The hall sensor 130 includes a sensor housing 131, provided with a bracket (not shown) to couple the cylinder body 110 to the hall sensor 130, and a magnetic detection element (a hall IC) 132, configured to control an on/off operation of a brake lamp by sensing change in the intensity of a magnetic force according to the positional change of the magnet 120. The sensor housing 131 is coupled to the outside of the cylinder body 110 by using a bolt, and thus easily attached and detached to/from the cylinder body 110.

The magnetic detection element 132 is installed while maximally adjacent to the magnet 120 provided at the first piston 111 inside the cylinder body 110. To this end, the magnetic detection element 132 is provided in an element casing 133 that protrudes outward from the sensor housing 131.

The element casing 133 is coupled to a mount hole 115 provided at the cylinder body 110. The mount hole 115 is spaced apart from the bore while provided in parallel to the bore. That is, as shown in the enlarged view of FIG. 4, the mount hole 115 is provided at a boosting apparatus fixing part 113 formed at the cylinder body 110 to be open in a direction oriented away from an opening of the bore of the cylinder body 110, the boosting apparatus fixing part 113 having a thickness greater than those of other parts of the cylinder body 10 and allowing a boosting apparatus (a booster) to be installed thereon. The master cylinder 100 has a predetermined thickness to withstand a liquid pressure generated from the inside of the master cylinder 100, and the boosting apparatus fixing part 113 has a thickness greater than those of other parts of the master cylinder 100 and thus enables the mount hole 115 to be easily formed therein. In addition, the mount hole 115 ends up closed by being combined with the element casing 133, so that the boosting apparatus fixing part 113 has a strength great enough to fix the boosting apparatus. In addition, the thickness of the cylinder body 110 corresponding to an interval between the mount hole 115 and the magnet 120 may be provided to be thin only to withstand the vacuum pressure so that the distance between the hall sensor 130 and the magnet 120 is minimized. Accordingly, a general magnet having a low magnetic flux density may be used.

Meanwhile, a reservoir tank 200 storing oil is installed at an upper side of the brake master cylinder 100 to supply oil to the master cylinder 100.

Accordingly, as for the brake master cylinder 100, a pressure difference generated by an operation of an input shaft connected to the brake pedal is transmitted to an output shaft, and the output shaft pushes the first piston 111 and the second piston 112 of the master cylinder 100 so that a hydraulic pressure is transferred to wheel cylinders (not shown), thereby generating a braking force.

Hereinafter, an operation of the master cylinder including the BLS sensor module having the above structure will be described with reference to the drawings in detail.

When a driver presses a brake pedal, the first piston 111 of the master cylinder 100 moves forward by a predetermined amount of stepping force that is required for a boosting apparatus or a pedal detection sensor. When the first piston 111 moves forward, oil in the first liquid pressure chamber 111a being closed is compressed, and accordingly, the second piston 112 moves forward, so that oil in the second liquid pressure chamber 112a is compressed. At this time, the first return spring 111b and the second return spring 112b provided at the front sides of the first piston 111 and the second piston 112, respectively, are compressed when the stepping force is applied to the brake pedal, and when the force is released, return the first and the second pistons 111 and 112, respectively, to the original positions through an elastic restoration force.

The hall sensor 130 installed at the outer side of the cylinder body 110 senses the movement of the first piston 110 when the first and second pistons 111 and 112 perform reciprocating motion. That is, when the first piston 111 moves forward, the magnet 120 provided at the first piston 111 moves together with the first piston 111, and the magnetic detection element 132 senses the movement of the magnet 120.

When the magnet 120 moves away from the magnetic detection element 132 together with the first piston 111, magnetic flux acting on the hall sensor 130 is decreased, and the hall sensor 130 having sensed the decrease in magnetic flux turns on the brake lamp. In contrary, when the first piston 111 returns to its original position, the hall sensor 130 turns off the brake lamp according to increase in the magnetic flux sensed by the hall sensor 130.

As is apparent from the above, the master cylinder has the BLS sensor module provided at the first piston (the primary piston) that operates while directly linked with a pedal, so that the master cylinder is prevented from failing to operate in some operating conditions, and a magnet of the BLS sensor module is provided in the first piston, and the hall sensor of the BLS sensor module is accommodated in the mount hole formed in the boosting apparatus fixing apparatus of the master cylinder so as to be maximally adjacent to the magnet, thereby enabling the master cylinder to have a compact structure.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A master cylinder comprising:
    a cylinder body provided with a hollow bore;
    a primary piston configured to perform a reciprocating motion in the hollow bore in linkage with a pedal;
    a secondary piston configured to move in linkage with the motion of the primary piston;
    a magnet provided at the primary piston and provided in a ring shape; and
    a hall sensor installed at an outer side of the cylinder body to correspond to the magnet and configured to control on/off operations of a brake lamp by sensing a magnetic flux density according to the reciprocating motion of the primary piston,
    wherein one side of the magnet is supported by the primary piston and another side of the magnet is supported by a return spring that is provided between the primary piston and the secondary piston, and
    wherein the cylinder body comprises a closed end portion, an open end portion comprising the bore, and a mount hole, and the mount hole in which the hall sensor is installed is open toward the closed end portion of the cylinder body and formed in parallel to the hollow bore of the cylinder body.

2. The master cylinder of claim 1, wherein the cylinder body includes a boosting apparatus fixing part at which a boosting apparatus is installed,
    wherein the mount hole is provided in the boosting apparatus fixing part.

3. The master cylinder of claim 1, wherein the hall sensor includes a sensor housing allowing the hall sensor to be coupled to the cylinder body, and a magnetic detection element configured to sense change in a magnetic force according to a positional change of the magnet,
    the magnetic detection element is provided in an element casing that protrudes from the sensor housing, and
    the element casing is insertedly fixed to the mount hole.

4. The master cylinder of claim 1, wherein the primary piston includes a groove into which the return spring is introduced, and the magnet is provided in the groove of the primary piston.

5. The master cylinder of claim 4, wherein the one side of the magnet is supported by an inner wall of the groove of the primary piston.

6. The master cylinder of claim 1, wherein at least one side of the magnet is provided with a washer.

7. The master cylinder of claim 6, wherein the washer comprise metal.

8. The master cylinder of claim 1, wherein the hall sensor is disposed closer to the primary piston than the secondary piston.

* * * * *